(12) United States Patent
Sagara

(10) Patent No.: US 8,380,835 B2
(45) Date of Patent: Feb. 19, 2013

(54) DEVICE MANAGEMENT SYSTEM, DEVICE MANAGEMENT METHOD, AND COMPUTER PROGRAM PRODUCT

(75) Inventor: Haruki Sagara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 401 days.

(21) Appl. No.: 12/724,012

(22) Filed: Mar. 15, 2010

(65) Prior Publication Data

US 2010/0241695 A1    Sep. 23, 2010

(30) Foreign Application Priority Data

Mar. 18, 2009    (JP) ................................ 2009-066270

(51) Int. Cl.
G06F 15/16    (2006.01)
G06F 3/12    (2006.01)

(52) U.S. Cl. ..................... 709/223; 709/217; 358/1.15

(58) Field of Classification Search .......... 709/201, 709/229, 223, 217; 358/1.15, 1.16
See application file for complete search history.

(56) References Cited

U.S. PATENT DOCUMENTS

| | | | |
|---|---|---|---|
| 2003/0053129 A1* | 3/2003 | Morooka et al. | 358/1.15 |
| 2005/0134902 A1* | 6/2005 | Mihira et al. | 358/1.15 |
| 2006/0080449 A1* | 4/2006 | Nagasawa et al. | 709/229 |
| 2007/0043805 A1* | 2/2007 | Izaki et al. | 709/201 |
| 2007/0086054 A1* | 4/2007 | Ikeno | 358/1.16 |
| 2008/0021991 A1* | 1/2008 | Kawai | 709/223 |
| 2009/0201546 A1* | 8/2009 | Ohashi | 358/1.15 |

FOREIGN PATENT DOCUMENTS

| | | |
|---|---|---|
| JP | 2004-213110 | 7/2004 |
| JP | 2005-197935 | 7/2005 |
| JP | 3743371 | 11/2005 |
| JP | 4013072 | 9/2007 |
| WO | WO 01/73558 A1 | 10/2001 |

* cited by examiner

*Primary Examiner* — Jungwon Chang
(74) *Attorney, Agent, or Firm* — Cooper & Dunham LLP

(57) ABSTRACT

A request receiving unit that receives device identifying information for identifying one or a plurality of devices and setting information containing a set value to be set in the device, an information transmitting unit transmits a setting request containing the setting information to the device identified by the device identifying information, a result collecting unit collects a set result indicating that the setting of all the set values is finished from the device to which the information transmitting unit transmits the setting request, and a result managing unit stores therein a collected set result and the device identifying information in association with each other. The information transmitting unit sequentially transmits the setting request to a device which is identified by the device identifying information and to which the setting request is not yet transmitted, regardless of whether the result collecting unit collects the set result from the device.

9 Claims, 4 Drawing Sheets

DEVICE MANAGEMENT SYSTEM, DEVICE MANAGEMENT METHOD, AND COMPUTER PROGRAM PRODUCT

CROSS-REFERENCE TO RELATED APPLICATIONS

The present application claims priority to and incorporates by reference the entire contents of Japanese Patent Application No. 2009-066270 filed in Japan on Mar. 18, 2009.

BACKGROUND OF THE INVENTION

1. Field of the Invention

The present invention relates to a system and method for managing one or a plurality of devices through a network so as to enable collective setting to be performed on the one or the plurality of devices, and a computer program product.

2. Description of the Related Art

There have been known device management systems that perform collective setting on printing devices such as a plurality of printers and MFPs (Multi Function Peripherals) through a network (for example, see Japanese Patent Application Laid-open No. 2004-213110, Japanese Patent Application Laid-open No. 2005-197935, Japanese Patent Publication No. 3743371 and Japanese Patent Publication No. 4013072). The systems capable of performing setting on the plurality of devices through the network and managing the devices do not require an operator to go over to places where the devices are provided and perform the setting thereon. Thus, the setting can be performed in a short time and the management thereof is easy.

Information to be set includes much information: IP address, subnet mask, installation location, user name, password, communication mode of a FAX unit, FAX number, and address book for electronic mail, and so on.

For example, Japanese Patent Application Laid-open No. 2004-213110 proposes a network management device that is connected to at least one device through which information can be acquired using SNNP/MIB through a network, and that sets setting items in the device. The network management device includes a unit that checks the presence of Object ID in order to list devices connected to the network and a unit that sets Object ID in the device so as to input set values of the setting items in the Object ID whose presence is checked by the unit. This allows the setting items such as various protocols to be collectively set in a plurality of devices by one operation.

Japanese Patent Application Laid-open No. 2005-197935 proposes a device setting apparatus that performs setting on a plurality of target devices connected to a network. The device setting apparatus includes a unit that receives collective setting information in which identification information to identify each of the plurality of target devices on the network is associated with device set information to be set in each of the plurality of target devices, and a device setting unit that identifies each of the target devices on the network by the identification information based on the collective setting information received by the unit and collectively sets device set information in the plurality of target devices through the network. This allows set information according to each target device to be easily set in the plurality of target devices without the need of acquiring information such as a model name from the plurality of target devices.

In Japanese Patent Publication No. 3743371, there are provided a unit that identifies a plurality of target devices being targets whose operational states are managed, among the devices, a unit that sets management control information for setting the operational state of the target device, and a unit that outputs the management control information to the target devices through a network and collectively sets the operational states of the target devices, so that the load of the devices that manage operational states is reduced.

In Japanese Patent Publication No. 4013072, there are provided a unit that checks a plurality of devices whether each of the devices satisfies predetermined target setting requirements, a unit that selects the device that satisfies the requirements as a setting target device, a unit that determines setting data to be transmitted to setting target devices, and a unit that collectively transmits the setting data to the setting target devices, so that there is no need for a user to select a device requiring the transmission of the setting data, which enables erroneous selection by the user to be prevented and change of the setting to be easily implemented.

However, in the conventional systems, because the setting process is synchronously performed between the device management system and the device, the device management system cannot shift to a next process until the setting process is completed in the device, which causes a waiting time to occur. More specifically, until the setting process is completed in the device, the device outputs notification that the process is completed, and the device management system receives the notification, the device management system cannot transmit setting information to a next device and cause it to perform the setting process.

Consequently, the more the number of devices being targets for setting or the number of set values to be set in one device increases, the longer the entire processing time becomes.

Therefore, it has been desired to provide a system and a method capable of quickly performing a process for collective setting on a plurality of devices.

SUMMARY OF THE INVENTION

It is an object of the present invention to at least partially solve the problems in the conventional technology.

According to an aspect of the present invention, there is provided a device management system that manages one or a plurality of devices connected thereto through a network. The device management system includes a request receiving unit that receives device identifying information for identifying the device and setting information containing one or more set values to be set in the device; an information transmitting unit that transmits a setting request containing the setting information to the device identified by the device identifying information; a result collecting unit that collects a set result, indicating that setting of all the set values is finished, from the device to which the information transmitting unit transmits the setting request; and a result managing unit that stores therein collected set result and the device identifying information in association with each other. The information transmitting unit sequentially transmits the setting request to a device which is identified by the device identifying information and to which the setting request is not yet transmitted, regardless of whether the result collecting unit collects the set result from the device.

According to another aspect of the present invention, there is provided a device management method implemented by a device management system for managing one or a plurality of devices connected thereto through a network. The device management method includes a step of receiving device identifying information for identifying the device and setting information containing one or more set values to be set in the device; a step of transmitting a setting request containing the setting information to the device identified by the device identifying information; a step of collecting a set result indicating that setting of all the set values is finished, from the device to which the setting request is transmitted at the step of transmitting; and a step of storing collected set result and the device identifying information in association with each other. The step of transmitting includes sequentially transmitting the setting request to a device which is identified by the device identifying information and to which the setting request is not yet transmitted, regardless of whether the set result is collected from the device at the step of collecting.

According to still another aspect of the present invention, there is provided a computer program product including a computer-readable recording medium containing a computer program which when executed on the computer causes the computer to execute a step of receiving device identifying information for identifying the device and setting information containing one or more set values to be set in the device; a step of transmitting a setting request containing the setting information to the device identified by the device identifying information; a step of collecting a set result indicating that setting of all the set values is finished, from the device to which the setting request is transmitted at the step of transmitting; and a step of storing collected set result and the device identifying information in association with each other. The step of transmitting includes sequentially transmitting the setting request to a device which is identified by the device identifying information and to which the setting request is not yet transmitted, regardless of whether the set result is collected from the device at the step of collecting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
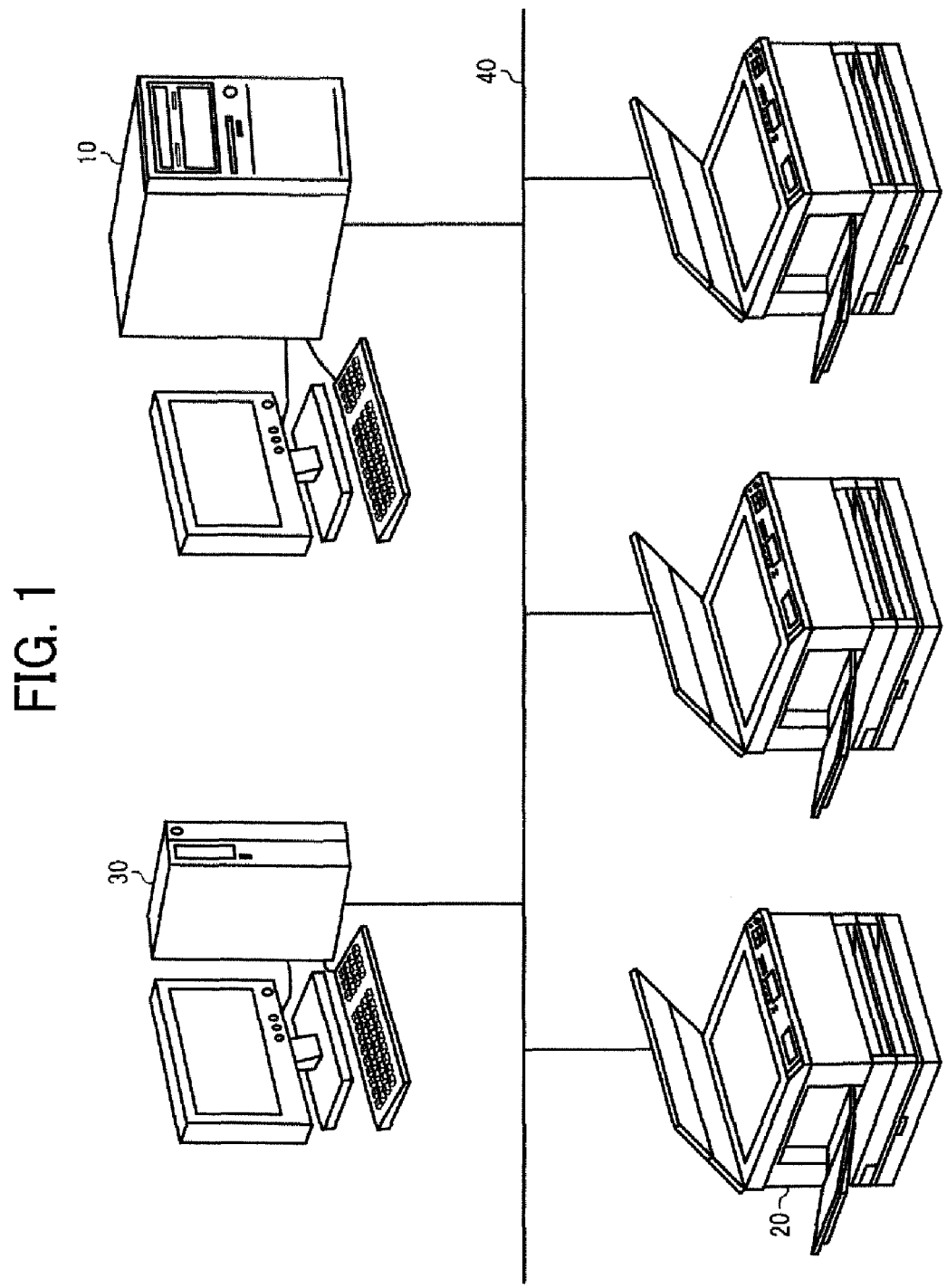
FIG. 1 is a schematic illustrating a network system including a device management system according to an embodiment of the present invention.

FIG. 1 is a schematic illustrating a configuration example of a network system including a device management system according to an embodiment of the present invention. The network system includes a device management system 10 formed as a server device, a device 20 formed as a plurality of MFPs, and a PC 30 for administrator, which are mutually connected to one another through a network 40.

The device management system 10 and the PC 30 for administrator each include an input unit such as a keyboard, a display unit for displaying an input character or the like, an input-output interface for controlling these input/output units, a storage unit such as a memory that stores therein a program or the like, a processor that reads and executes the program and processes input data, and a network I/F for connecting the device management system 10 and the PC 30 for administrator to the network 40. The storage unit such as the memory stores therein various application programs; an OS that controls input/output to/from the input unit and the display unit, provides basic functions used commonly from many applications such as management of a disk and memory, and manages the entire device; BIOS that controls peripheral devices such as the input unit and the display unit; and other data. Moreover, the device management system 10 and the PC 30 for administrator each are also mounted with a driver for controlling the device 20.

The device management system 10 and the PC 30 for administrator have the same configuration as each other, however, the device management system 10 does not need to be provided with the input unit and the display unit, or does not need to be mounted with the driver.

The device 20, which can be the MFP, performs a drawing process based on print data in response to reception of the print data from the PC 30 for administrator or from any other PC or the like connected to the network 40, prints the print data on paper, and outputs the paper. The device 20 is provided with a printer. Assuming that the printer is an electrophotographic printer, the printer includes a photosensitive drum, a charging unit that charges the photosensitive drum, an exposing unit that forms a latent image on the charged photosensitive drum, a developing unit that develops the latent image formed on the photosensitive drum, a primary transfer unit that transfers toner image formed by causing toner to adhere to the latent image through the development to a transfer belt that moves at a constant velocity, a paper feeding unit that feeds a paper, a secondary transfer unit that transfer the toner image formed on the transfer belt to the paper, a fixing unit that fixes the toner image transferred to the paper on the paper, and a paper ejecting unit that ejects the paper. In addition to these, the printer includes a cleaning unit that removes toner remaining on the photosensitive drum and the transfer belt, and a sensor used to perform position correction and density correction.

The device 20 has a print function, a scanner function, a FAX function, and a copy function. Therefore, the device 20 includes an engine to implement these functions, a controller to control the engine, and a memory. The device 20 also includes a network I/F to perform communication through the network 40, and keys and an operation panel through which a FAX number is entered and a magnification is changed, to be displayed.

The device management system 10 manages a plurality of devices 20 through the network 40, and transmits a setting request containing setting information to the plurality of devices 20, so that collective setting can be performed. The setting information of the device 20 includes information such as user name and password as authentication information, communication mode of the FAX unit, FAX number, address book for electronic mail, time, security setting, and various parameters, or the like.

The device 20 is managed by the device management system 10, and can perform various settings by receiving the setting request from the device management system 10.

The PC 30 for administrator can browse UI of the device management system 10 through the network 40. Moreover, the PC 30 for administrator can select a device, on which collective setting is performed, from among the devices managed by the device management system 10, or can enter the setting information.

In FIG. 1, the device management system 10 and the PC 30 for administrator are separately provided, however, a single unit of PC may be provided. The device managed by the device management system 10 is not limited to the device 20, and therefore a printer, a scanner, and a FAX unit may be used. In addition, the number of devices managed by the device management system 10 may be any number such as 100 units and 1000 units.

Inter-device communication can be preformed by using various protocols. UDP (User Datagram Protocol) being a standard protocol used in the Internet has a high transfer speed, but has low reliability. Therefore, TCP/IP (Transmission Control Protocol/Internet Protocol) is preferred because it is highly reliable although the transfer speed is low.

The device management system 10 transmits the same data to the plurality of devices 20, and it is therefore possible to transmit the setting request by multicast. However, if there is a router or the like between the device management system 10 and the device 20, the transmission of the setting request may be stopped by the router or the like, so that the setting request may not be delivered or the certainty is low, and thus, the communication is preferably performed using the TCP/IP by unicast.

As the protocol to monitor and manage the network system, SNMP (Simple Network Management Protocol) can be used. However, because the SNMP is a protocol mapped at the top of the UDP, the reliability is low and the certainty is also low, and thus it is preferable that communication is performed using the TCP/IP.

Figure 2:
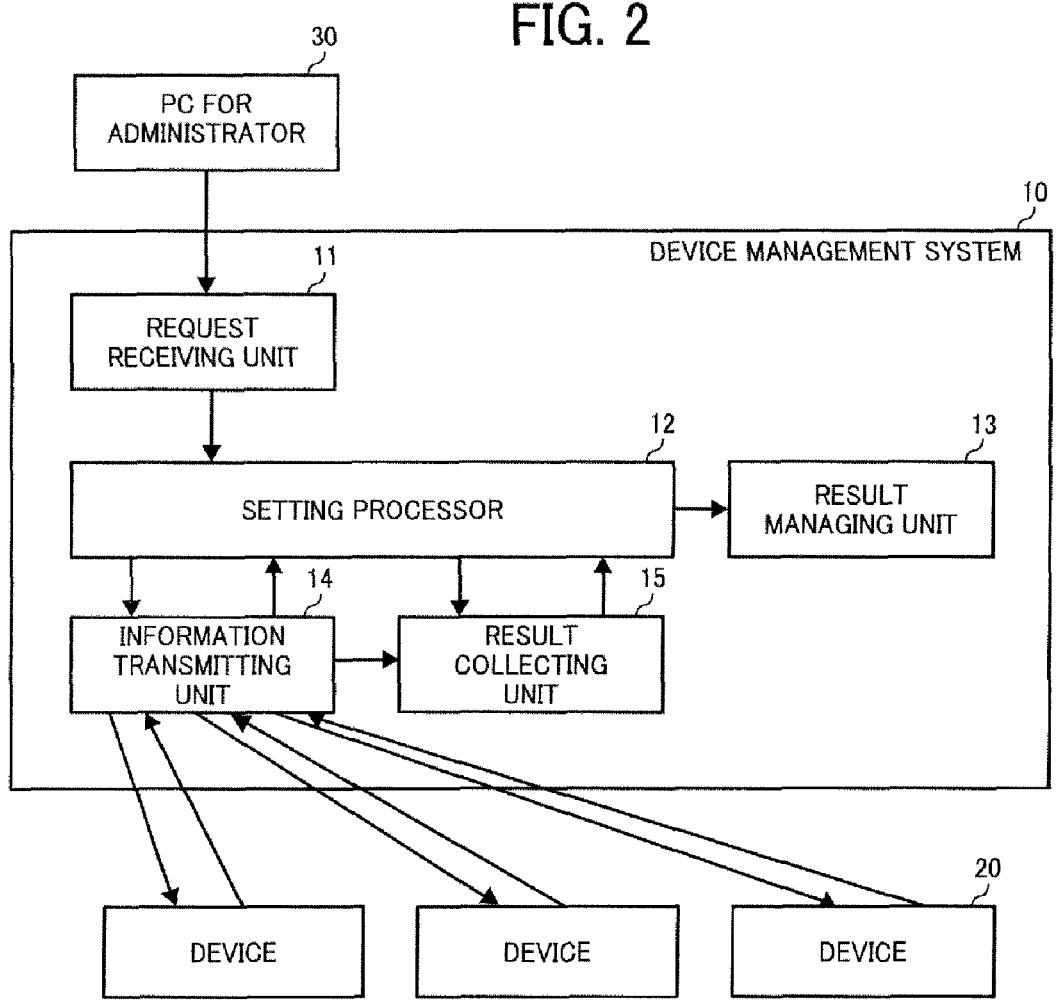
FIG. 2 is a diagram representing a module configuration of the device management system shown in FIG. 1.

FIG. 2 is a block diagram of a configuration representing one embodiment of the device management system 10. The device management system 10 includes a request receiving unit 11 that causes the user to enter identification information for a device as a target for collective setting among the devices 20 connected to the network 40 and also to enter a set value as the setting information, and that receives the information; a setting processor 12 that performs a collective setting process on a plurality of devices; a result managing unit 13 that stores therein and manages the identification information and set results of the devices, an information transmitting unit 14 that transmits a setting request containing the setting information to the devices through the network 40, and a result collecting unit 15 that collects the set results from the devices through the network 40.

The request receiving unit 11 causes the user to enter the identification information such as a device name of the device as a target for collective setting, an IP address, and a MAC address, and, at this time, may cause a registered device name or the like to be displayed, so that the user can select it. The result managing unit 13 stores therein device identifying information for the device name or the like received by the request receiving unit 11. The setting processor 12 controls processes from transmitting the information to storing the result and instructs the information transmitting unit 14 to transmit a setting request based on the device identifying information, and instructs the result collecting unit 15 to collect set results.

The set result is information indicating that all the set values of the setting information contained in the setting request are set, and if there is any value that is not yet set, the set result cannot be collected.

When receiving the setting request, the device 20 starts the process of setting the set values of the setting information contained in the setting request one by one, however, the setting process may be interrupted caused by a case where copying is executed by the user or by reboot, or the like. Therefore, there may be a case in which even if the result collecting unit 15 of the device management system 10 requests the set result, the setting process is not yet completed and the set result cannot thereby be returned.

In this case, the result collecting unit 15 leaves the collection from the device 20 till later, tries the collection from any other device identified by the device identifying information, and tries the collection from all the other devices, and then, inquires whether the set result can be collected again, and tries the collection. Such a process is repeated until the number of times has reached a predetermined number or until the time has reached a predetermined time, and the collection of the set result is tried. Eventually, if the set result cannot be collected, then the result to that effect is associated with the device identifying information to be stored in the result managing unit 13.

The configuration of the device management system has been explained so far with reference to the figure. However, the device also receives the setting request, performs setting process thereon, and stores the set result indicating that all the set values are set, and, therefore, the device includes a request receiving unit, a setting processor, and a result managing unit similarly to these of the device management system.

More specifically, the request receiving unit receives a setting request from the device management system, the setting processor sets all the one or more set values contained in the setting request and finishes all the setting, and then generates a set result, and the result managing unit stores therein the set result. The setting processor causes the result managing unit 13 to store therein the set result, and sends, if the result collecting unit 15 requests the set result, the generated set result thereto.

These units can be implemented by forming them as a computer program, storing the computer program in the storage unit such as the memory, and reading and executing the computer program by the processor.

Figure 3:
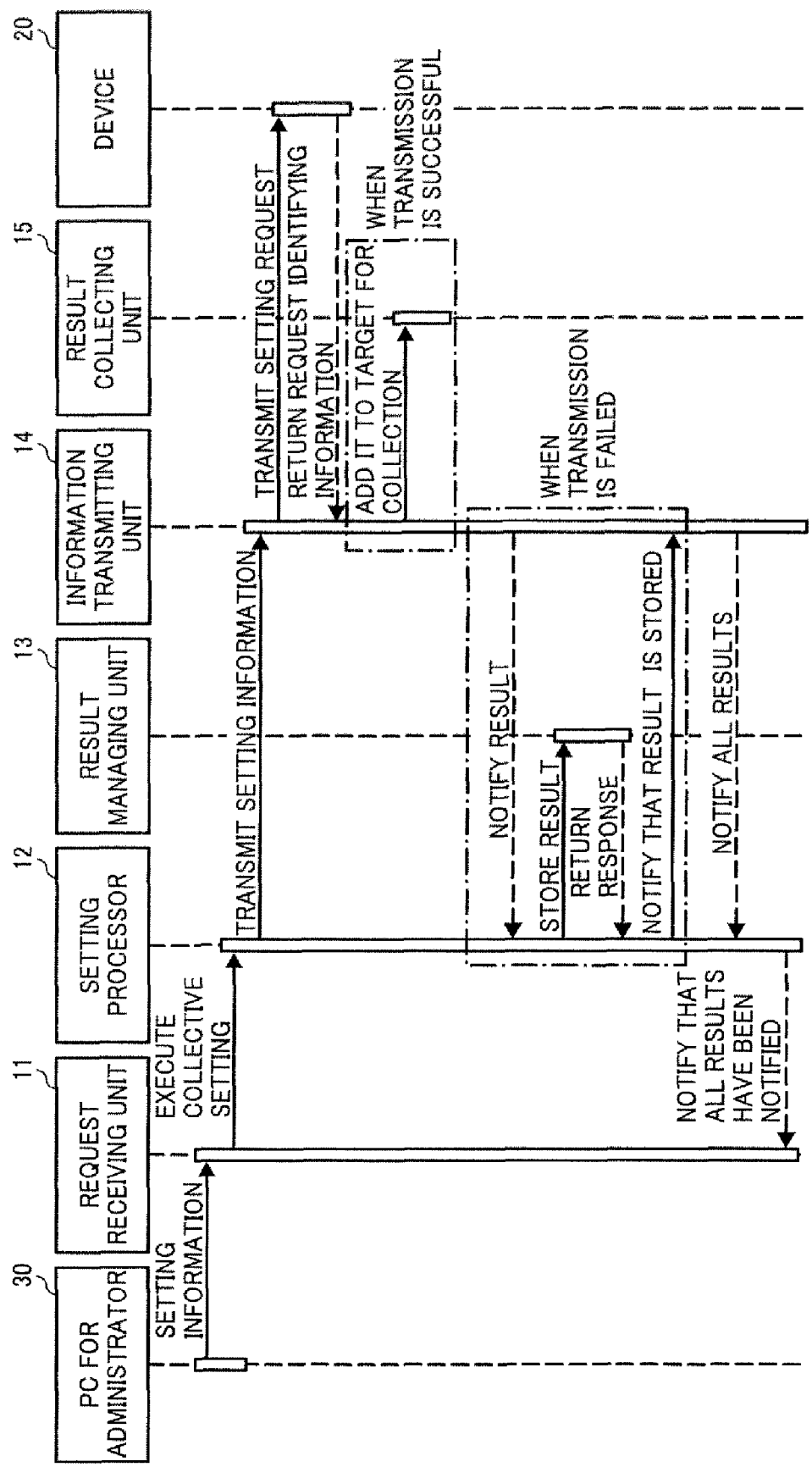
FIG. 3 is a sequence diagram representing a flow of processes from receiving setting information to transmitting a setting request.

The flow of the processes from receiving the setting information to transmitting the setting request is explained in detail below with reference to the sequence diagram shown in FIG. 3. The user uses the PC 30 for administrator to enter the device identifying information for the device being a target for collective setting and the setting information, and transmits the information to the device management system 10.

The PC 30 for administrator can also be configured so as to establish communication with the device management system 10 in order to use the process, and then receive a screen prompting the user to enter the user name and the password from the device management system 10, and, by entering these data by the user, enter the device identifying information and the setting information.

The request receiving unit 11 provided in the device management system 10 receives these information and transfers these information to the setting processor 12 so as to execute the collective setting. The setting processor 12 transmits these information to the information transmitting unit 14, and the information transmitting unit 14 generates a setting request including the setting information based on the device identifying information and transmits the setting request to a target device through the network 40.

The device having received the setting request returns the request identifying information to identify the setting request to the information transmitting unit 14 because the transmission is successful. The request identifying information may be set as a number or the like allocated to each request. The information transmitting unit 14 transmits the request identifying information to the result collecting unit 15, and the result collecting unit 15 stores therein the request identifying information together with the device identifying information, and adds the request identifying information as a target for collection of the set result. These information can be formed as a table and stored. The table in this case can include a request identifying information field to enter the request identifying information and a device identifying information field to enter the device identifying information.

The information transmitting unit 14 transmits the setting request including the setting information based on the device identifying information. If the transmission is failed, then the information transmitting unit 14 notifies the setting processor 12 of failure in the transmission. The case of the failure includes a case of power disconnection of a target device. The setting processor 12 stores the result indicating the failure in the transmission in the result managing unit 13. The result managing unit 13 finishes the storage of the result, and returns a response to the effect that the storage is finished. For example, if the request identifying information cannot be acquired within a predetermined time, this can be determined as failure in the transmission. The predetermined time can be set as an appropriate time in consideration of the whole setting process time.

The process is repeated to all the devices specified by the user, and the setting processor 12 waits until all the results are notified, notifies the request receiving unit 11 accordingly when all the results have been notified, and ends the transmission process of the setting request.

The process can be executed when the request receiving unit 11 receives the setting request or by scheduler. The information transmitting unit 14 sequentially transmits the setting request to a plurality of devices without waiting for completion of the setting process in each of the devices.

Figure 4:
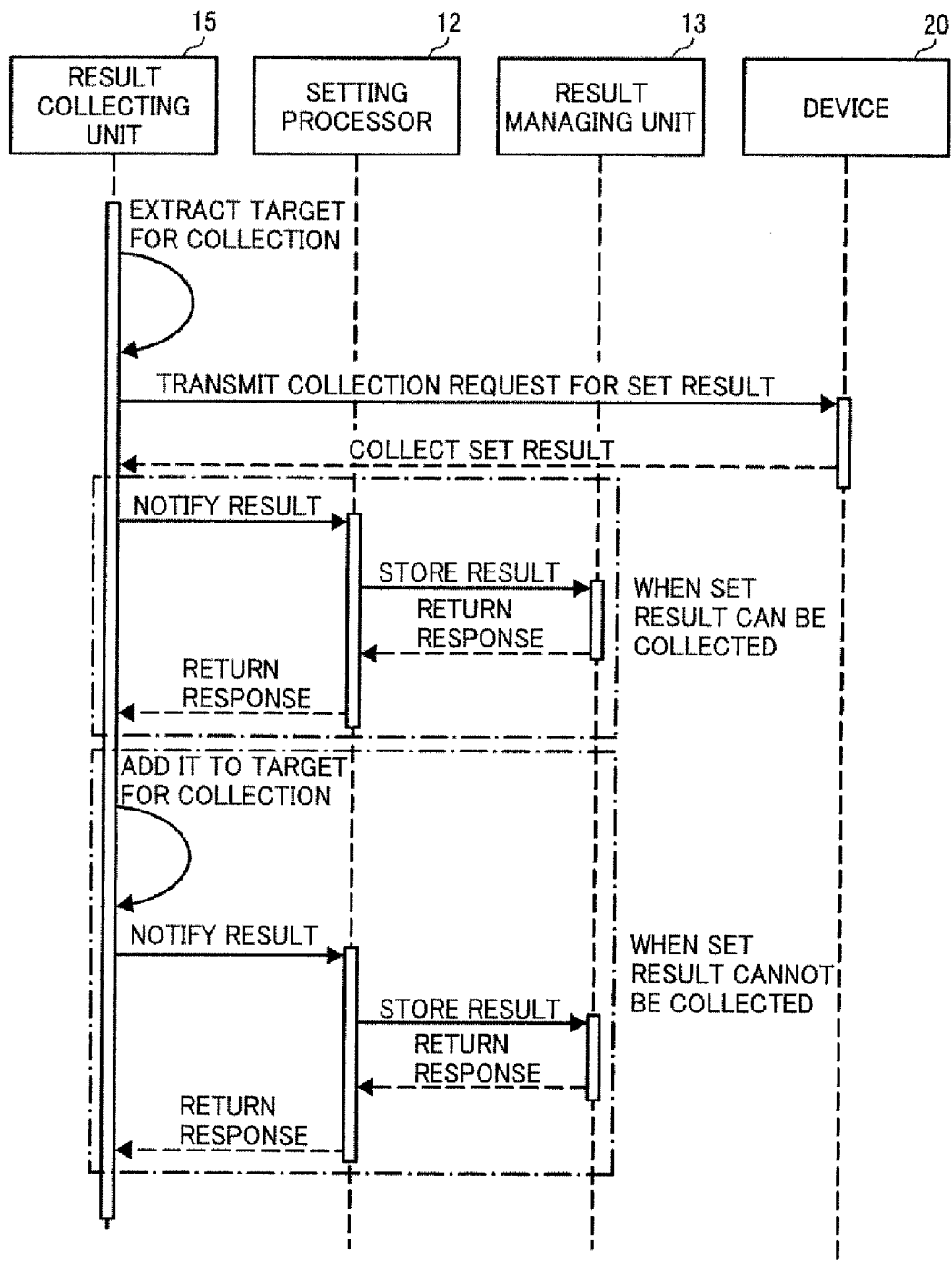
FIG. 4 is a sequence diagram representing a flow of processes for collecting set results.

The flow of processes for collecting the setting request is explained in detail below with reference to the sequence diagram shown in FIG. 4. The result collecting unit 15 sequentially extracts request identifying information as a target for collection stored as a table or the like, and tries collecting the set result from a target device based on the device identifying information associated with the request identifying information.

More specifically, the set result can be collected by transmitting the request for collection of the set result and receiving the result to that effect that all the settings are completed. If the setting process is completed in the target device, the device transmits the set result to the result collecting unit 15, while if it is not completed, then the device returns a response to the effect that the setting process is not completed to the result collecting unit 15.

When the set result can be collected in this manner, the result collecting unit 15 transmits the set result to the setting processor 12 and stores it in the result managing unit 13.

Meanwhile, when the set result cannot be collected, the result collecting unit 15 determines whether the number of retry times has reached a predetermined number or the time has reached a predetermined time, and retries collecting the set result when either one of the two has not reached the predetermined value. If the set result can be collected in another collection, the setting processor 12 stores the set result in the result managing unit 13.

If the collection cannot yet be achieved even if the tries, the collection process of the set result is repeated. However, when the number of retry times has reached a predetermined number or the time has reached a predetermined time, the result collecting unit 15 notifies the setting processor 12 of the result to the effect that the collection cannot be achieved, and the setting processor 12 stores the result in the result managing unit 13. The process is repeatedly executed until there becomes no target device for collection.

In this manner, because the transmission of the setting information and the collection of the set result are performed asynchronously, the transmission of the setting information can be sequentially performed, and this allows reduction of the waiting time. As a result, it is possible to quickly implement the collective setting process to a plurality of devices.

As explained above, the set result to be identified by the request identifying information is collected from the device identified by the device identifying information, and thus the result managing unit 13 can accurately store and manage the set result for each device.

If because the setting process is not completed by the device 20 and the set result is not therefore stored, the device 20 can collect the number of set values contained in the received setting information, the time required for the process in the device 20 dependent on the type of the set values, and a progress situation of the process at the time point, and return a predicted time required from completing the entire setting process to storing the set result. In other words, it is calculated from these information how much time is still required, and the time is returned as a predicted time.

More specifically, first, the entire process time can be calculated from the number of set values and respective process times required depending on the type of the set values. Next, by subtracting a time point or a progress situation of the process at the time point at which the collection request is received (time required for the process up to the time point) from the entire process time, the remaining time can be calculated.

The result collecting unit 15 controls a next collecting time based on the predicted time returned from the device 20, so that the inquiry for collection is prevented from being repeated. This allows reduction of wasteful network traffic.

It is also possible to again transmit the setting request to the device to which the transmission of the setting request is failed after the setting request is transmitted to all the devices identified by the device identifying information. The result of failure is stored in the result managing unit 13, and, therefore, the transmission can also be tried again after passage of a predetermined time. In this case, the result managing unit 13 will instruct the setting processor 12 to perform the setting process, and therefore the result managing unit 13 needs to store therein the device set information and the setting information in order to issue the instruction. Because of this, when the setting information is transmitted to the information transmitting unit 14, the setting processor 12 can also transmit the setting information to the result managing unit 13 and register the information therein.

The present invention has been explained so far using the embodiment, however, the present invention is not limited thereto. Therefore, the present invention can be modified within a scope that can be thought of by persons skilled in the art, such as other embodiments, addition, modification, and deletion, and any of the modes will be included in the scope of the present invention if they have the same functions and effects as these of the present invention. Therefore, the present invention can be configured as the device management method containing processing steps performed by the device management system and a computer-readable return program for implementing the method, in addition to the device management system. Moreover, the program can also be provided by being recorded on a recording medium such as a flexible disk, CD, DVD, SD card, and a flash memory. Furthermore, a device managed by the device management system can be provided, and the device may be used as a single unit.

According to an aspect of the present, there is provided an information transmitting unit that sequentially transmits a setting request containing setting information to one or a plurality of devices without waiting for completion of the setting process in the device, and a result collecting unit that collects a set result asynchronously with the transmission. The information transmitting unit requests the result collecting unit to collect the set result when the transmission is successful, and the result collecting unit collects the set result from the device as a target for collection.

In this manner, the transmission of the setting request containing the setting information and the collection of the set result are performed asynchronously, and this allows the system to shift the next process without waiting for the completion of the setting process in the device. Thus, the setting request can be sequentially transmitted to one or a plurality of devices, so that the waiting time can be reduced as compared with that of the case of the conventional synchronous process. This enables collective setting process for the one or the plurality of devices to be quickly completed.

According to another aspect of the present invention, there is provide a device management system that manages one or a plurality of devices connected thereto through a network.

The information transmitting unit sequentially transmits the setting request to the device which is identified by the device identifying information and to which the setting request is not yet transmitted, regardless of whether the result collecting unit collects the set result from the device.

If the set result cannot be collected, the result to that effect is stored in association with the device identifying information. This allows quick completion of the collective setting process without being prolonged.

This allows the number of times of repeating inquiry for collection to be reduced and wasteful network traffic to be reduced.

This allows the set result for each device to be accurately stored for each request.

According to another aspect of the present invention, there is provided a device managed by the device management system and a device management method including processes performed in the system as processing steps. The method includes the processing steps respectively performed by the units that form the device management system, and these processing steps can be implemented by executing a computer-readable program. Therefore, the present invention can also provide the computer-readable program in order to implement the device management method.

The computer program can be provided by being recorded on a recording medium, and the present invention can also provide the recording medium with the program recorded thereon.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management system that manages one or a plurality of devices connected thereto through a network, the device management system comprising:
   a request receiving unit that receives device identifying information for identifying the device and setting information containing one or more set values to be set in the device;
   an information transmitting unit that transmits a setting request containing the setting information to the device identified by the device identifying information;
   a result collecting unit that collects a set result, indicating that setting of all the set values is finished, from the device to which the information transmitting unit transmits the setting request; and
   a result managing unit that stores therein collected set result and the device identifying information in association with each other, wherein
   the information transmitting unit sequentially transmits the setting request to a device which is identified by the device identifying information and to which the setting request is not yet transmitted, regardless of whether the result collecting unit collects the set result from the device,
   wherein when the result collecting unit transmits a collection request for the set result to the device and cannot collect the set result because the setting of all the set values by the device is not finished, the result collecting unit receives a predicted time until the setting of all the set values is finished, the predicted time being calculated by the device from a number of the set values contained in the setting information, a time required for a setting process of all the set values, and from a time required for a setting process at a time point of receiving the collection request and being returned to the result collecting unit, and controls a time for trying collection of the set result from the device based on the predicted time.

2. The device management system according to claim 1, wherein when the setting of all the set values by the device is not finished and therefore the set result cannot be collected, the result collecting unit repeats a process for leaving the collection of the set result from the device until later, until a number of times or a time reaches a predetermined number or a predetermined time, and tries the collection of the set result.

3. The device management system according to claim 1, wherein the information transmitting unit receives request identifying information for identifying the setting request from the device to which the setting request is transmitted, and transmits received request identifying information to the result collecting unit so as to collect the set result for each setting request.

4. A device management method implemented by a device management system for managing one or a plurality of devices connected thereto through a network, the device management method comprising:
   a step of receiving device identifying information for identifying the device and setting information containing one or more set values to be set in the device;
   a step of transmitting a setting request containing the setting information to the device identified by the device identifying information;
   a step of collecting a set result indicating that setting of all the set values is finished, from the device to which the setting request is transmitted at the step of transmitting; and
   a step of storing collected set result and the device identifying information in association with each other, wherein
   the step of transmitting includes sequentially transmitting the setting request to a device which is identified by the device identifying information and to which the setting request is not yet transmitted, regardless of whether the set result is collected from the device at the step of collecting, and wherein when a collection request for the set result is transmitted to the device and the set result cannot be collected because the setting of all the set values by the device is not finished, the step of collecting includes receiving a predicted time until the setting of all the set values is finished, the predicted time being calculated by the device from a number of set values contained in the setting information, a time required for a setting process of all the set values, and from a time required for a setting process at a time point of receiving the collection request and being returned; and controlling a time for trying collection of the set result from the device based on the predicted time.

5. The device management method according to claim 4, wherein when the setting of all the set values by the device is not finished and therefore the set result cannot be collected, the step of collecting includes repeating a process for leaving the collection of the set result from the device until later, until a number of times or a time reaches a predetermined number or a predetermined time, and tries the collection of the set result.

6. The device management method according to claim 4, wherein the step of transmitting includes receiving request identifying information for identifying the setting request from the device to which the setting request is transmitted, and the step of collecting includes collecting the set result identified by received request identifying information.

7. A computer program product including a non-transitory computer-readable recording medium containing a computer program which when executed on the computer causes the computer to execute:

a step of receiving device identifying information for identifying the device and setting information containing one or more set values to be set in the device;

a step of transmitting a setting request containing the setting information to the device identified by the device identifying information;

a step of collecting a set result indicating that setting of all the set values is finished, from the device hich the setting request is transmitted at the step of transmitting; and a step of storing collected set result and the device identifying information in association with each other, wherein the step of transmitting includes sequentially transmitting the setting request to a device which is identified by the device identifying information and to which the setting request is not yet transmitted, regardless of whether the set result is collected from the device at the step of collecting, and wherein when a collection request for the set result is transmitted to the device and the set result cannot be collected because the setting of all the set values by the device is not finished, the step of collecting includes receiving a predicted time until the setting of all the set values is finished, the predicted time being calculated by the device from a number of set values contained in the setting information, a time required for a setting process of all the set values and from a time required for a setting process at a time point of receiving the collection request and being returned; and controlling a time for trying collection of the set result from the device based on the predicted time.

8. The computer program product according to claim 7, wherein when the setting of all the set values by the device is not finished and therefore the set result cannot be collected, the step of collecting includes repeating a process for leaving the collection of the set result from the device until later, until a number of times or a time reaches a predetermined number or a predetermined time, and tries the collection of the set result.

9. The computer program product according to claim 7, wherein the step of transmitting includes receiving request identifying information for identifying the setting request from the device to which the setting request is transmitted, and the step of collecting includes collecting the set result identified by received request identifying information.

* * * * *